United States Patent
Ryu et al.

(10) Patent No.: US 12,046,953 B2
(45) Date of Patent: Jul. 23, 2024

(54) DUAL ROTOR-TYPE MOTOR HAVING IMPROVED STATOR STRUCTURE, AND COMPRESSOR COMPRISING SAME

(71) Applicant: LG Electronics Inc., Seoul (KR)

(72) Inventors: Dongseok Ryu, Seoul (KR); Kiman Kim, Seoul (KR); Sangjoon Eum, Seoul (KR)

(73) Assignee: LG Electronics Inc., Seoul (KR)

( * ) Notice: Subject to any disclaimer, the term of this patent is extended or adjusted under 35 U.S.C. 154(b) by 1018 days.

(21) Appl. No.: 16/967,685

(22) PCT Filed: Jan. 30, 2019

(86) PCT No.: PCT/KR2019/001317
§ 371 (c)(1),
(2) Date: Aug. 5, 2020

(87) PCT Pub. No.: WO2019/156419
PCT Pub. Date: Aug. 15, 2019

(65) Prior Publication Data
US 2021/0036591 A1 Feb. 4, 2021

(30) Foreign Application Priority Data
Feb. 8, 2018 (KR) .................. 10-2018-0015884

(51) Int. Cl.
*H02K 16/02* (2006.01)
*F25B 1/02* (2006.01)
(Continued)

(52) U.S. Cl.
CPC ............. *H02K 1/278* (2013.01); *F25B 1/02* (2013.01); *H02K 1/2791* (2022.01); *H02K 16/02* (2013.01); *H02K 29/03* (2013.01); *H02K 2201/03* (2013.01)

(58) Field of Classification Search
CPC ........ H02K 1/278; H02K 1/27; H02K 1/2791; H02K 1/274; H02K 1/26; H02K 1/265; H02K 1/06; H02K 16/02; H02K 16/00; H02K 29/03; H02K 2201/03; H02K 2213/03; F25B 1/02
See application file for complete search history.

(56) References Cited

U.S. PATENT DOCUMENTS 6,547,538 B1    4/2003    Tamura et al.
8,207,648 B2 *   6/2012    Li .......................... H02K 16/02
                                                         310/216.069
(Continued)

FOREIGN PATENT DOCUMENTS

CN    110429778 A  * 11/2019  .......... H02K 16/04
CN    112583221 A  * 3/2021
(Continued)

*Primary Examiner* — Edgardo San Martin
(74) *Attorney, Agent, or Firm* — Fish & Richardson P.C.

(57) ABSTRACT

A dual rotor-type motor includes a stator having a coil wound therearound, an outer rotor, and an inner rotor. The stator includes inner teeth facing the inner rotor, and outer teeth facing the outer rotor, and the inner teeth are misaligned in a rotating direction by as much as an angle with respect to the outer teeth, which may enable the reduction of a torque ripple to a satisfying level, even without having to change the design of the stator structure into a complicated form.

5 Claims, 6 Drawing Sheets

(51) Int. Cl.
  *H02K 1/278*   (2022.01)
  *H02K 1/2791*  (2022.01)
  *H02K 29/03*   (2006.01)

(56) References Cited

U.S. PATENT DOCUMENTS

| | | | |
|---|---|---|---|
| 8,987,962 B2* | 3/2015 | Kim | H02K 16/00 |
| | | | 310/112 |
| 9,621,014 B2 | 4/2017 | Yang et al. | |
| 10,367,398 B2* | 7/2019 | Tojima | H02K 19/103 |
| 10,404,146 B2* | 9/2019 | Hattori | H02K 16/02 |
| 10,873,226 B2* | 12/2020 | Namba | H02K 3/12 |
| 2004/0232800 A1* | 11/2004 | Seguchi | H02K 16/02 |
| | | | 310/266 |
| 2004/0239199 A1* | 12/2004 | Qu | H02K 21/16 |
| | | | 310/266 |
| 2009/0009019 A1 | 1/2009 | Li et al. | |
| 2009/0091204 A1* | 4/2009 | Koshiba | H02K 16/02 |
| | | | 310/114 |
| 2010/0066085 A1* | 3/2010 | Gu | F03D 7/04 |
| | | | 290/55 |
| 2010/0295401 A1* | 11/2010 | Nakagawa | H02K 16/02 |
| | | | 310/156.53 |
| 2013/0057091 A1* | 3/2013 | Kim | H02K 19/103 |
| | | | 310/46 |
| 2013/0243626 A1 | 9/2013 | Kim | |
| 2016/0036366 A1 | 4/2016 | Yang et al. | |
| 2021/0044186 A1* | 2/2021 | Ryu | H02K 7/003 |

FOREIGN PATENT DOCUMENTS

| | | | |
|---|---|---|---|
| CN | 116032087 A | * | 4/2023 |
| JP | 2001073948 | | 3/2001 |
| JP | 2003299327 | | 10/2003 |
| KR | 1020090004451 | | 1/2009 |
| KR | 1020100085057 | | 7/2010 |
| KR | 1020120076172 | | 7/2012 |
| KR | 1020130044754 | | 5/2013 |
| KR | 1020130092887 | | 8/2013 |

* cited by examiner

FIG.1

[PRIOR ART]

[PRIOR ART]

DUAL ROTOR-TYPE MOTOR HAVING IMPROVED STATOR STRUCTURE, AND COMPRESSOR COMPRISING SAME

CROSS-REFERENCE TO RELATED APPLICATIONS

This application is a National Stage application under 35 U.S.C. § 371 of International Application No. PCT/KR2019/001317, filed on Jan. 30, 2019, which claims the benefit of Korean Patent Application No. 10-2018-0015884, filed on Feb. 8, 2018. The disclosures of the prior applications are incorporated by reference in their entirety.

TECHNICAL FIELD

The present invention relates to a dual rotor-type motor having an improved stator structure to prevent efficiency reduction of a motor and reduce a cogging torque and a torque ripple and a compressor including the same.

BACKGROUND

Vibration and noise of motors are generated due to cogging torque, torque ripples, and electromagnetic oscillation sources Among them, the cogging torque and the torque ripple are generated due to a change in magnetic flux of a stator when a rotor rotates and may be improved through a core design.

In the conventional interior permanent magnet (IPM) motor, a torque ripple is reduced through a method of skewing a stator, multi-layer permanent magnets of a rotor, or the like to improve vibration and noise. However, the conventional method has various disadvantages from viewpoints of manufacturing and machining of the motor.

Figure 1:
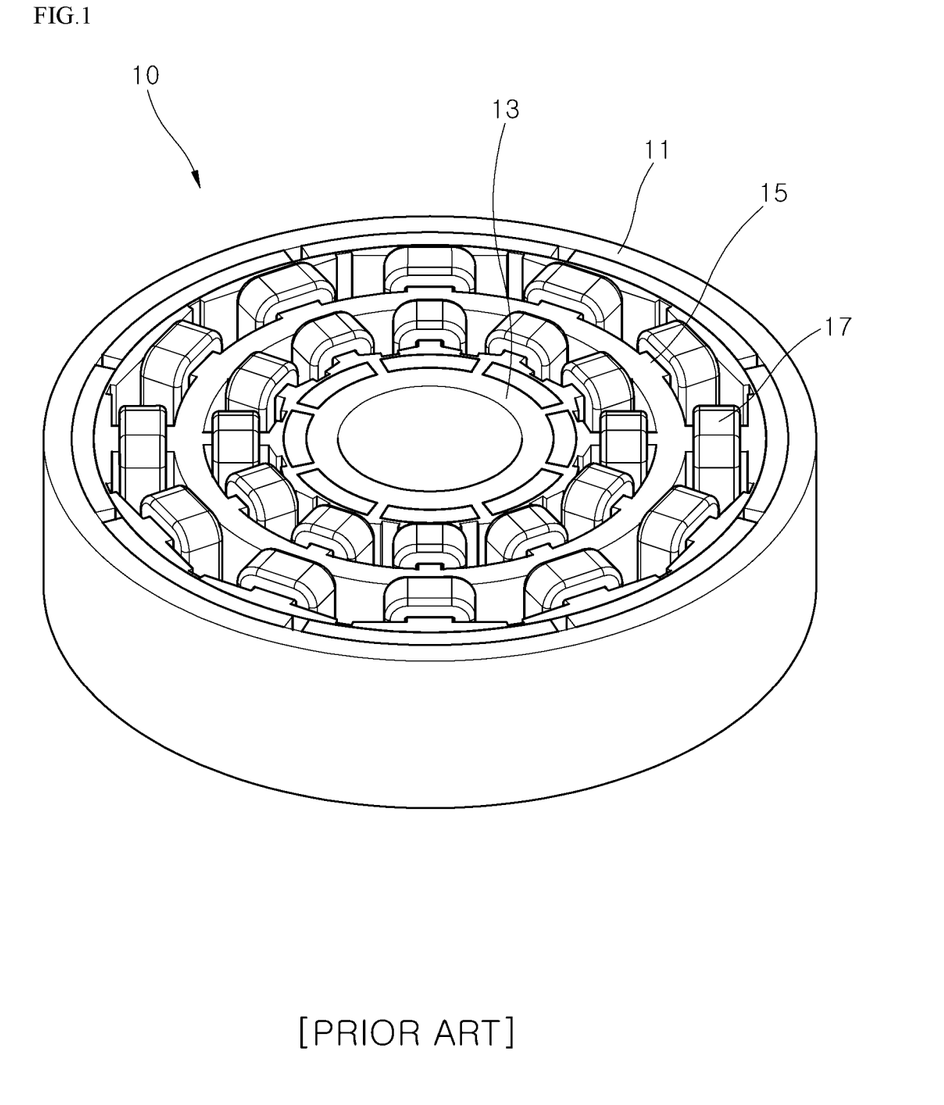
FIG. 1 is a schematic view illustrating a conventional dual rotor-type motor.

FIG. 1 is a schematic view illustrating a conventional dual rotor-type motor.

As illustrated in the drawing, a conventional dual rotor-type motor 10 includes an outer rotor 11, an inner rotor 13, and a stator 15.

The outer rotor 11 on which a plurality of permanent magnets 11a and 11b are disposed at an inner side thereof in a circumferential direction and the inner rotor 13 on which a plurality of permanent magnets 13a are disposed at an outer side thereof in the circumferential direction rotate on outer and inner sides of the stator 15.

Accordingly, currents flow through coils 17 wound around the stator 15 positioned between the outer rotor 11 and the inner rotor 13 to generate torque. In addition, in the case of the dual rotor-type motor 10, a value of a total torque is calculated by summing the torque generated by the outer rotor 11 and the inner rotor 13.

However, even in the case of the dual rotor-type motor 10, there is a problem of generating vibration and noise, and accordingly, efforts to reduce a cogging torque or torque ripple are being made to reduce the vibration and noise.

In Korean Patent Publication No. 10-2013-0092887 (Publication Date: Aug. 21, 2013, hereinafter, referred to as Related Art 1), a permanent magnet motor is disclosed as a related art related to the present invention. In the case of the permanent magnet motor disclosed in Related Art 1, a torque ripple may be minimized by adjusting heights of tooth extensions, distances between the tooth extensions which are adjacent to each other, electrical angles of the tooth extensions, and angles of linear portions of tooth extension portions of stator teeth. However, since teeth of Related Art 1 should be improved with a complicated structure, it is difficult to machine.

In addition, in Korean Patent Publication No. 10-2010-0085057 (Publication Date: Jul. 28, 2010, hereinafter, referred to as Related Art 2), a dual rotor motor is disclosed as another related art related to the present invention. The disclosed dual rotor motor of Related Art 2 suppresses a cogging torque to realize a low noise effect by improving a tooth structure of a stator core such that an angle of an inner slot is greater than that of an inner slot. However, there are problems in that, it is practically difficult to machine teeth to have a shape according to Related Art 2, and a cost is increased due to the machining.

In addition, in Korean Patent Publication No. 10-2013-0044754, a permanent magnet motor is disclosed as still another related art related to the present invention. In Related Art 3, the permanent magnet motor allows assemblability between teeth and a rotor to be improved, deformation and a failure rate of the rotor to be reduced, and a cogging torque to be reduced by minimizing leakage flux. However, in Related Art 3, a tooth extension portion is formed on a side end of an outer circumference of the tooth in a circumferential direction, a cut groove is formed from the outer circumference of the tooth toward a center of a shaft of a rotor, and an intrusion groove into which an molding object is inserted is formed in an inner circumference of the tooth in a radial direction. In order to provide the complicated structure of the tooth, there are problems in that a long time is required for machining and a machining cost is increased.

Accordingly, a technical solution is required to simply improve a stator structure so as to reduce a cogging torque and a torque ripple.

SUMMARY

The present invention is directed to providing a dual rotor-type motor allowing a cogging torque and a torque ripple to be reduced by misaligning inner and outer side teeth of a stator without machining teeth to have a complicated shape and a complicated structure.

The present invention is also directed to providing a dual rotor-type motor allowing vibration and noise to be reduced by improving a shape of a stator slot while an output of a motor is maintained.

Objectives of the present invention are not limited to the above described objectives, and other objectives and advantages of the present invention may be understood by the following descriptions and clearly understood by embodiments of the present invention. In addition, it may be seen that the objectives and the advantages of the present invention may be made using elements and combinations thereof described in the appended claims.

One aspect of the present invention provides a dual rotor-type motor of which a torque ripple is reduced by misaligning inner and outer side teeth of a stator by a predetermined angle.

The dual rotor-type motor according to one embodiment of the present invention includes a stator around which a coil is wound, an outer rotor which is installed to face an outer wheel of the stator and on which a plurality of permanent magnets are disposed on an inner circumferential surface facing the outer wheel of the stator in a circumferential direction, and an inner rotor which is installed to face an inner wheel of the stator and on which a plurality of permanent magnets are disposed on an outer circumferential surface facing the inner wheel of the stator in the circumferential direction. In this case, the stator may include inner side teeth facing the inner rotor and outer side teeth facing the outer rotor, and the inner side teeth may be misaligned with the outer side teeth by a preset angle with respect to the outer side teeth in a rotation direction. In addition, in the dual rotor-type motor according to one embodiment of the present invention, the inner side teeth may be misaligned with the outer side teeth by an angle of greater than or equal to −2° to less than 0° or greater than 0° to less than or equal to 4° based on the outer side teeth. In this case, a first magnetic flux generated by the permanent magnets disposed on the outer rotor and a second magnetic flux generated by the permanent magnets disposed on the inner rotor may share and flow through the stator and be mutually interfered with by each other so that a torque ripple may be reduced due to misalignment between the inner side teeth and the outer side teeth.

Another aspect of the present invention provides a dual rotor-type motor of which a torque ripple is reduced through a method of adjusting a size of an open slot portion between inner side teeth and a size of an open slot portion between outer side teeth of a stator at a predetermined ratio without reducing efficiency of the motor.

The dual rotor-type motor according to another embodiment of the present invention includes a stator around which a coil is wound, an outer rotor which is installed to face an outer wheel of the stator and on which a plurality of permanent magnets are disposed on an inner circumferential surface facing the outer wheel of the stator in a circumferential direction, and an inner rotor which is installed to face an inner wheel of the stator and on which a plurality of permanent magnets are disposed on an outer circumferential surface facing the inner wheel of the stator in the circumferential direction, wherein the stator includes inner side teeth facing the inner rotor and outer side teeth facing the outer rotor. In this case, a first open slot portion may be formed to have a first gap between the inner side teeth which are adjacent to each other, and a second open slot portion may be formed to have a second gap between the outer side teeth which are adjacent to each other. In this case, a size of the second gap of the second open slot portion may be greater than a size of the first gap of the first open slot portion by a present ratio.

In addition, in the dual rotor-type motor according to another embodiment of the present invention, the size of the second gap may be greater than 1.2 to 1.4 times the size of the first gap.

Still another aspect of the present invention provides a compressor including a dual rotor-type motor of which a torque ripple is reduced by misaligning inner and outer side teeth of a stator without reducing motor efficiency. The compressor includes the a dual rotor-type motor including the stator around which a coil is wound, an outer rotor which is installed to face an outer wheel of the stator and on which a plurality of permanent magnets are disposed on an inner circumferential surface facing the outer wheel of the stator in a circumferential direction, and an inner rotor which is installed to face an inner wheel of the stator and on which a plurality of permanent magnets are disposed on an outer circumferential surface facing the inner wheel of the stator in the circumferential direction, wherein the stator includes the inner side teeth facing the inner rotor and the outer side teeth facing the outer rotor, and the inner side teeth are misaligned with the outer side teeth by a preset angle with respect to the outer side teeth in a rotation direction, a shaft which passes through and is coupled to rotation centers of the outer rotor and the inner rotor and rotates with the outer rotor and the inner rotor, a connecting rod which is connected to an upper portion of the shaft and linearly moves a piston using rotation of the shaft, a cylinder which compresses a refrigerant using the piston, and a cylinder block which supports the shaft and through which the cylinder is provided. Accordingly, the present invention has an advantage in machining when compared to a conventional method of skewing in a motor and can prevent efficiency reduction of a motor.

Yet another aspect of the present invention provides a compressor including a dual rotor-type motor of which a torque ripple is reduced through a method of adjusting a size of an open slot portion between inner side teeth and a size of an open slot portion between outer side teeth of a stator at a predetermined ratio without reducing efficiency of a motor. The compressor includes the stator around which a coil is wound, an outer rotor which is installed to face an outer wheel of the stator and on which a plurality of permanent magnets are disposed on an inner circumferential surface facing the outer wheel of the stator in a circumferential direction, and an inner rotor which is installed to face an inner wheel of the stator and on which a plurality of permanent magnets are disposed on an outer circumferential surface facing the inner wheel of the stator in the circumferential direction, wherein the stator includes the inner side teeth facing the inner rotor and the outer side teeth facing the outer rotor, a first open slot portion is formed to have a first gap between the inner side teeth which are adjacent to each other, a second open slot portion is formed to have a second gap between the outer side teeth which are adjacent to each other, and sizes of the first and second open slot portions are adjusted at a preset ratio to reduce a torque ripple, a shaft which passes through and is coupled to rotation centers of the outer rotor and the inner rotor and rotates with the outer rotor and the inner rotor, a connecting rod which is connected to an upper portion of the shaft and linearly moves a piston using rotation of the shaft, a cylinder which compresses a refrigerant using the piston, and a cylinder block which supports the shaft and through which the cylinder is provided. Accordingly, the present invention may reduce a torque ripple like a skew effect while reducing inconvenience in machining in a method of applying skew in a motor.

According to the present invention, a torque ripple can be reduced to a satisfactory level through a method of misaligning inner and outer side teeth of a stator by a predetermined angle without changing a design of a stator structure to have a complicated shape.

Particularly, in a case in which the inner side teeth shift within a predetermined angular range (for example, from −2° to +4°) from the outer side teeth, a torque ripple can be significantly improved while a motor is maintained in an equivalent level of efficiency thereof. Accordingly, the present invention has an advantage in machining when compared to a conventional structure (for example, a stator core rotational stacking structure and a permanent magnet multiple stage stacking structure) that reduces a torque ripple by skewing in the motor and can prevent efficiency reduction of the motor.

In addition, according to the present invention, a torque ripple can be reduced through a method of adjusting a size of an open slot portion between the inner side teeth and a size of an open slot portion between the outer side teeth of the stator at a predetermined ratio without reducing efficiency of the motor.

Particularly, a size (X1) of the open slot portion between the inner side teeth and a size (X2) of the open slot portion between the outer side teeth can be adjusted at a predetermined ratio, for example, X2/X1=1.2 to 1.4. Accordingly, a torque ripple can be reduced like a skew effect, and a problem of reducing an effect of the motor due to reduction of torque in the conventional case can be prevented.

Specific effects and the above-described effects of the present invention will be described while specific embodiments for realizing the present invention are described.

DETAILED DESCRIPTION

Hereinafter, embodiments of the present invention will be described in detail with reference to the accompanying drawings in order for those skilled in the art to easily perform the present invention. The present invention may be implemented in several different forms and is not limited to the embodiments described herein.

Parts irrelevant to the description will be omitted in order to clearly describe the present invention, and the same or similar parts are denoted by the same reference numerals throughout this specification. In addition, some embodiments of the present invention will be described in detail with reference to exemplary drawings. When the reference numerals are assigned to elements of each drawing and the same elements are illustrated in different drawings, the same reference numerals may be assigned to the same elements if possible. Also, in the descriptions of the present invention, when detailed descriptions of related known structures or functions are deemed to unnecessarily obscure the gist of the present invention, they will be omitted.

In descriptions of components of the present invention, it should be understood that, when an element is referred to as being "connected or coupled" to another element, the element may be directly connected or coupled to another element, still another element may be interposed therebetween, or the elements may be connected or coupled by still another element.

First Embodiment

Figure 2:
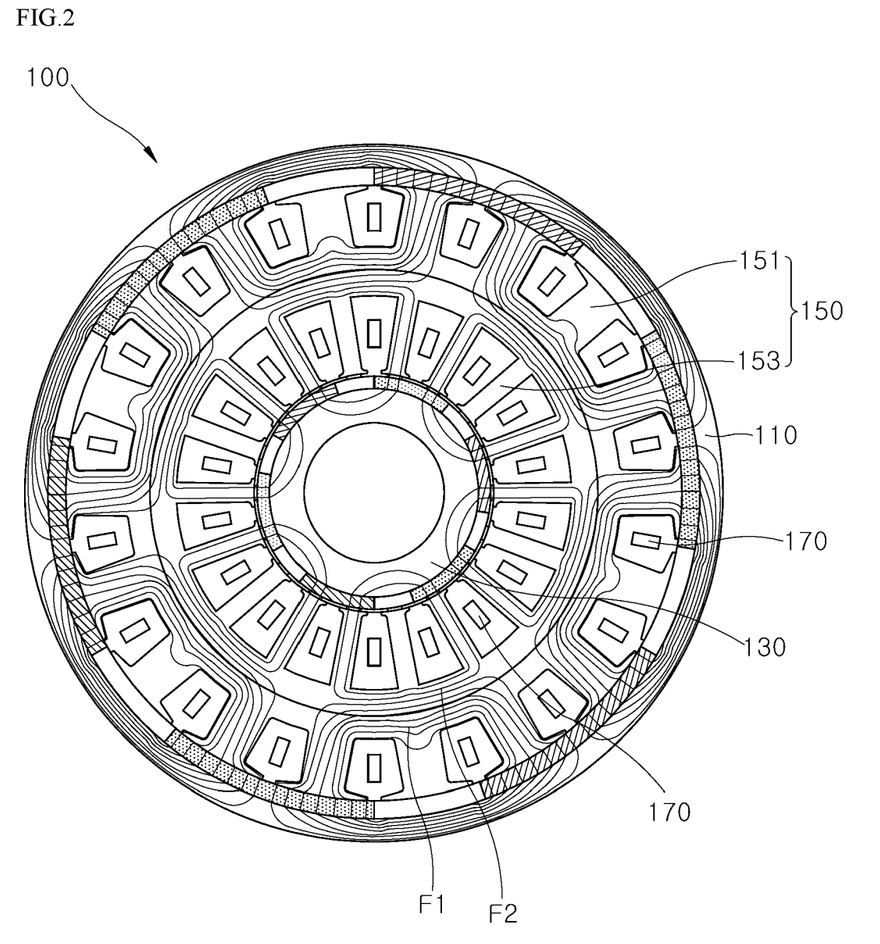
FIG. 2 is a plan view illustrating a dual rotor-type motor.

FIG. 2 is a plan view illustrating a dual rotor-type motor. An illustrated dual rotor-type motor 100 includes an outer rotor 110, an inner rotor 130, and a stator 150.

Coils 170 are wound around the stator 150.

In this case, the stator 150 includes outer side teeth 151 and inner side teeth 153.

In this case, the outer side teeth 151 refer to portions formed to protrude to face the outer rotor 110.

In addition, the inner side teeth 153 refer to portions formed to protrude to face the inner rotor 130.

However, the present invention is not limited to specific shapes of the outer side teeth 151 and the inner side teeth 153 illustrated in FIG. 2, and the outer side teeth 151 and the inner side teeth 153 may also have other shapes which are different from the illustrated shapes.

The outer rotor 110 is installed to face an outer wheel of the stator 150.

Specifically, the outer rotor 110 may have a structure in which a plurality of permanent magnets are disposed on an inner circumferential surface (or inner side surface) facing the outer wheel of the stator 150 in a circumferential direction. For example, the permanent magnets having N- and S-poles may be alternately disposed on the inner circumferential surface of the outer rotor 110 in the circumferential direction.

The inner rotor 130 is installed to face an inner wheel of the stator 150.

Specifically, the inner rotor 130 may have a structure in which a plurality of permanent magnets are disposed on an outer circumferential surface (or outer side surface) facing the inner wheel of the stator 150 in the circumferential direction. For example, the permanent magnets having N- and S-poles may be alternately disposed on the outer circumferential surface of the inner rotor 130 in the circumferential direction.

The outer rotor 110 is formed to rotate at an outer side of the stator 150, and the inner rotor 130 is formed to rotate at an inner side of the stator 150.

Since the outer rotor 110 and the inner rotor 130 are formed to rotate at the outer and inner sides of the stator 150 as described above, currents flow through the coils wound around the stator 150 to generate a torque.

First magnetic fluxes F1 (that is, outer side magnetic flux flows) are generated by the permanent magnets disposed on the outer rotor 110. Like this, second magnetic fluxes F2 (that is, inner side magnetic flux flows) are generated by the permanent magnets disposed on the inner rotor 130.

The flows of the magnetic fluxes F1 and F2 share and flow through one stator 150 positioned between outer rotor 110 and the inner rotor 130, and a mutual interference may occur between the magnetic fluxes F1 and F2. When the dual rotor-type motor 100 according to one embodiment of the present invention is designed using the mutual interference between the magnetic fluxes, a cogging torque and a torque ripple thereof may be reduced.

Figure 3:
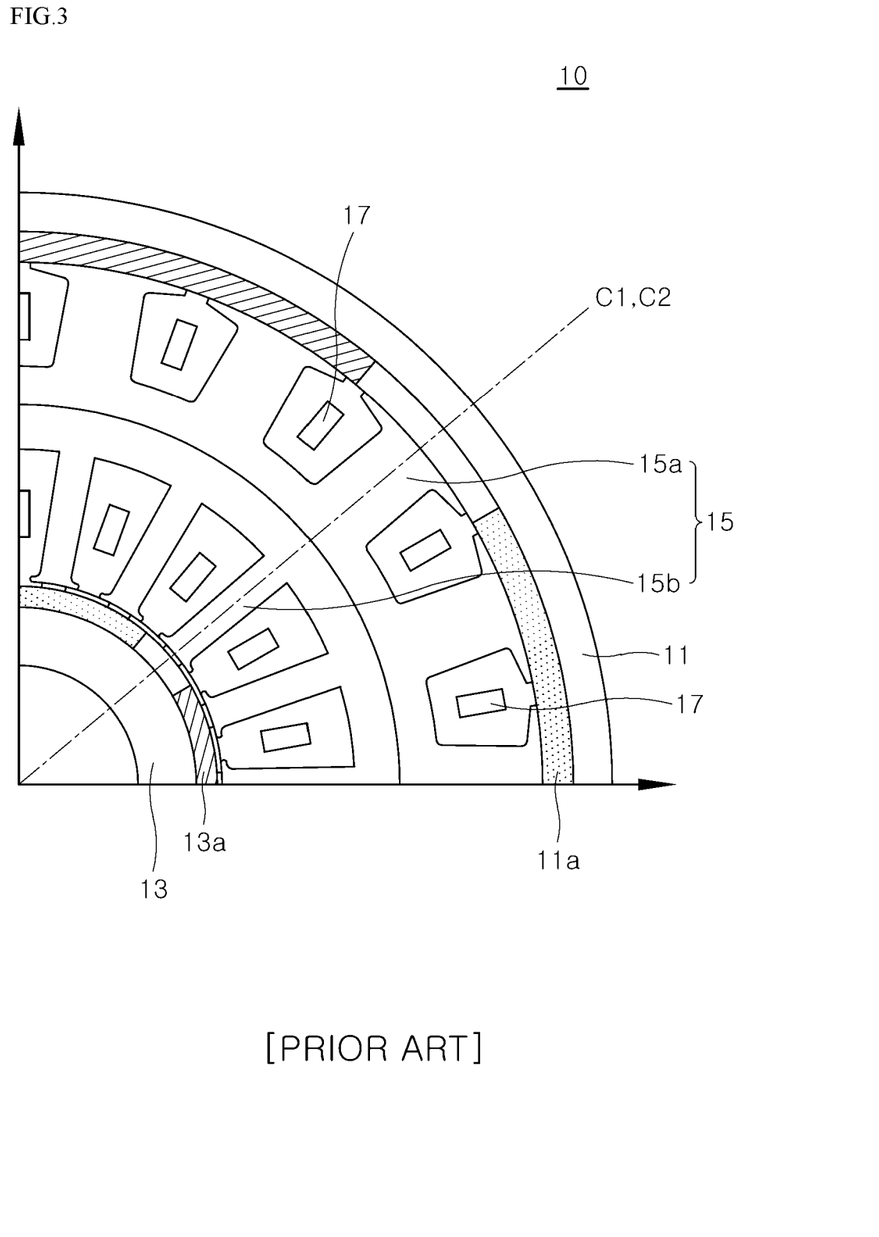
FIG. 3 is a schematic view illustrating a stator structure of a conventional dual rotor-type motor.
Figure 4:
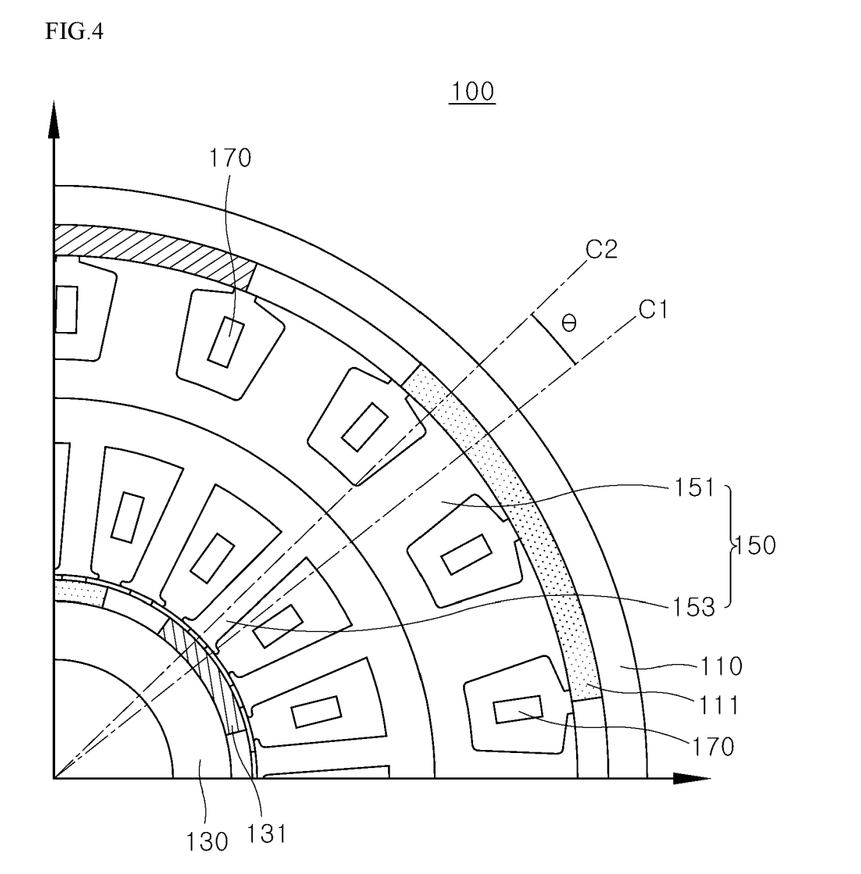
FIG. 4 is a schematic view illustrating a stator structure of a dual rotor-type motor according to one embodiment of the present invention.

FIG. 3 is a schematic view illustrating a stator structure of a conventional dual rotor-type motor, and FIG. 4 is a schematic view illustrating a stator structure of a dual rotor-type motor according to one embodiment (hereinafter, a first embodiment) of the present invention.

Referring to FIG. 3, a conventional dual rotor-type motor 10 is shown. The conventional dual rotor-type motor 10 illustrated in FIG. 3 includes an outer rotor 11 in which permanent magnets 11a are provided on an inner side surface, an inner rotor 13 in which permanent magnets 13a are provided on an outer side surface, and a stator 15 which is positioned between the outer rotor 11 and the inner rotor 13 and around which coils 17 are wound.

In the case of the conventional dual rotor-type motor 10, as illustrated in FIG. 3, an alignment reference line C1 of outer side teeth 15a is the same as an alignment reference line C2 of the inner side teeth 15b.

Referring to FIG. 4, the dual rotor-type motor 100 according to the first embodiment of the present invention includes the outer rotor 110 on which the permanent magnets 111 are provided on the inner side surface, the inner rotor 130 on which the permanent magnets 131 are provided on the outer side surface, and the stator 150 around which the coils 170 are wound.

Specifically, in the dual rotor-type motor 100 according to the first embodiment of the present invention, the outer side teeth 151 and the inner side teeth 153 are misaligned.

In other words, the inner side teeth 153 facing the inner rotor 130 and the outer side teeth 151 facing the outer rotor 110 are misaligned by a preset angle with respect to the outer side teeth 151 in a rotation direction.

As illustrated in FIG. 4, an alignment reference line C2 of the inner side teeth 153 and an alignment reference line C1 of the outer side teeth 151 are misaligned by a predetermined angle θ.

For example, the inner side teeth 153 and the outer side teeth 151 may be misaligned by an angular range of greater than or equal to −2° to less than 0° or greater than 0° to less than or equal to 4° based on the outer side teeth 151.

The number of the permanent magnets 111 disposed on the outer rotor 110 may be equal to the number of the permanent magnets 131 disposed on the outer circumferential surface of the inner rotor 130, and the permanent magnets 111 may be disposed opposite to the permanent magnets 131.

When the outer rotor 110 and the inner rotor 130 rotate at the outer and inner sides of the stator 150, currents flow through the coils wound around the stator 150 to generate a torque.

As a result, the flow of the first magnetic flux F1 (see FIG. 2) is generated through the permanent magnets 111 disposed on the outer rotor 110, and the flow of the second magnetic flux F2 (see FIG. 2) is generated through the permanent magnets 131 disposed on the inner rotor 130.

The first and second magnetic fluxes F1 and F2 (see FIG. 2) share and flow through the single stator 150, a mutual interference occurs between the magnetic fluxes, and a torque ripple is reduced due to misalignment between the inner side teeth 153 and the outer side teeth 151.

Figure 5:
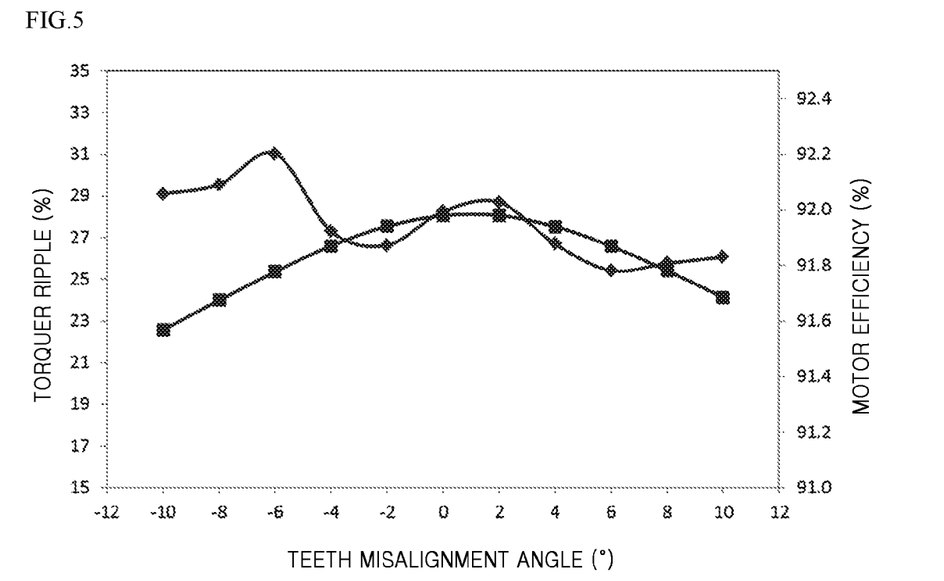
FIG. 5 is a graph showing motor efficiency and a torque ripple according to a misalignment angle between inner and outer side teeth in the stator structure of the dual rotor-type motor according to one embodiment of the present invention.

FIG. 5 is a graph showing motor efficiency and a torque ripple according to a misalignment angle between the inner and outer side teeth in the stator structure of the dual rotor-type motor according to the first embodiment of the present invention.

Referring to FIG. 5, it can be seen that a torque ripple is reduced while a motor is maintained in an equivalent level of efficiency thereof in a range in which a misalignment angle between the outer side teeth 151 (see FIG. 4) and the inner side teeth 153 (see FIG. 4) is in the range of −2° to 4°.

As described above, according to the dual rotor-type motor according to the first embodiment of the present invention, by simply changing a structure such that the inner and outer side teeth of the stator are misaligned by a predetermined angle, a torque ripple can be decreased to a satisfactory level.

As a result, the present invention has an advantage of machining, does not decrease efficiency of the motor, and can reduce vibration and noise when compared to a conventional method of decreasing a torque ripple by skewing (for example: a stator core rotational stacking structure, a permanent magnet multiple stage stacking structure, etc.).

Second Embodiment

Figure 6:
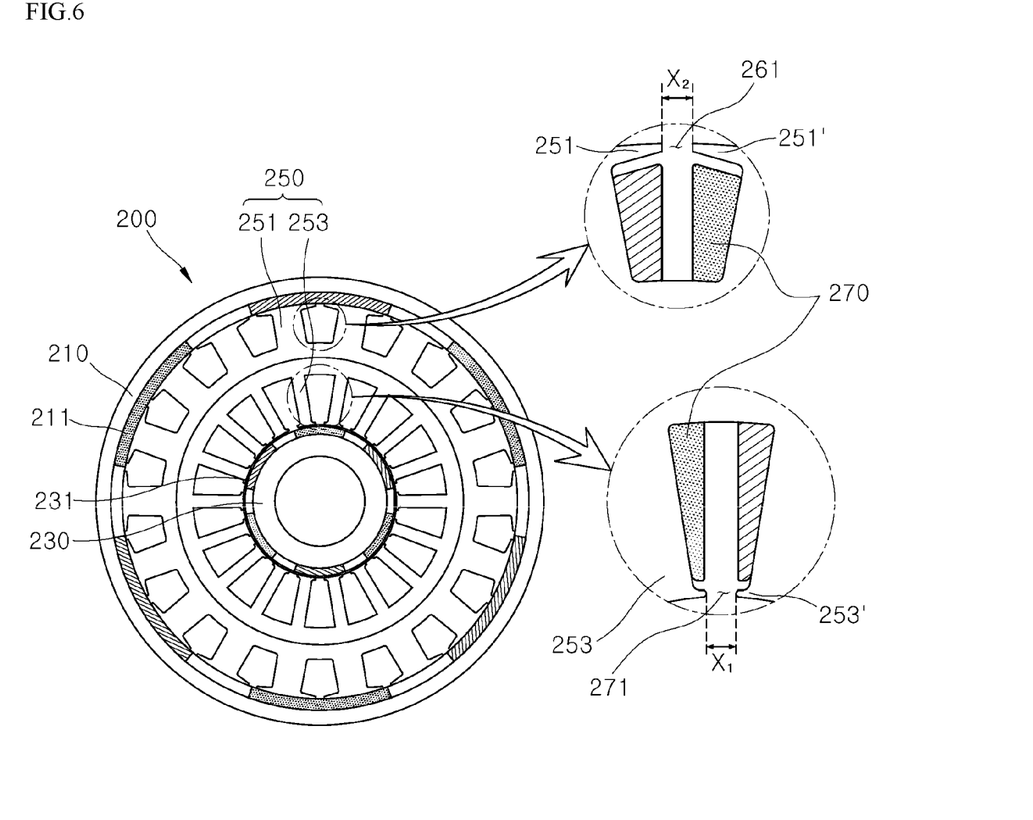
FIG. 6 is a plan view illustrating a dual rotor-type motor according to another embodiment of the present invention.

FIG. 6 is a plan view illustrating a dual rotor-type motor according to another embodiment (hereinafter, second embodiment) of the present invention.

Referring to FIG. 6, a dual rotor-type motor 200 according to the second embodiment of the present invention includes an outer rotor 210, an inner rotor 230, and a stator 250.

Coils 270 are wound around the stator 250, and the stator 250 includes outer side teeth 251 and inner side teeth 253.

The outer rotor 210 is installed to face an outer wheel of the stator 250, and a plurality of permanent magnets 211 are disposed on an inner circumferential surface in a circumferential direction. In other words, the permanent magnets having N- and S-poles may be alternately disposed on the inner circumferential surface of the outer rotor 210.

The inner rotor 230 is installed to face an inner wheel of the stator 250, and a plurality of permanent magnets 231 are disposed on an outer circumferential surface in the circumferential direction. That is, the permanent magnets having N- and S-poles may be alternately disposed on the outer circumferential surface of the inner rotor 230.

The outer rotor 210 rotates at an outer side of the stator 250, and the inner rotor 230 rotates at an inner side of the stator 250. In this case, currents flow through the coils 270 wound around the stator 250 to generate a torque.

Meanwhile, in the dual rotor-type motor 200 according to the second embodiment of the present invention, first open slot portions 271 are formed to have first gaps X1 between inner side teeth 253 and 253' which are adjacent to each other. In addition, second open slot portions 261 are formed to have second gaps X2 between outer side teeth 251 and 251' which are adjacent to each other.

In this case, the second gap X2 of the second open slot portion 261 may be formed to be greater than the first gap X1 of the first open slot portion 271 at a preset ratio.

Specifically, a size of the second gap X2 of the second open slot portion 261 may be 1.2 to 1.4 times a size of the first gap X1 of the first open slot portion 271.

Figure 7:
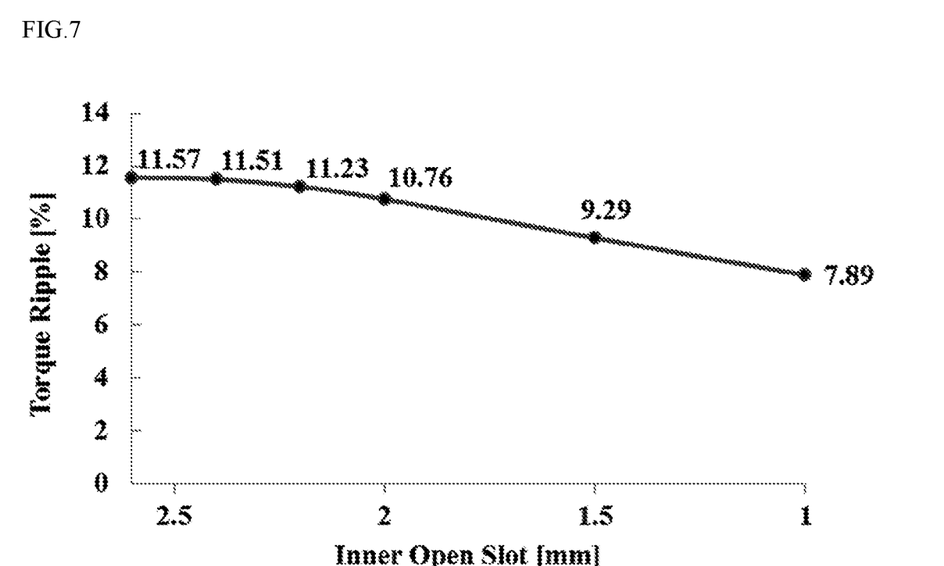
FIG. 7 is a graph showing a torque ripple in a case in which a size of a second open slot portion is maintained to be constant and a size of a first open slot portion is changed.

In a case in which the second gap X2 of the second open slot portion 261 is less than 1.2 times the first gap X1 of the first open slot portion 271, a target torque ripple reduction effect may not be obtained. On the contrary, in a case in which the second gap X2 of the second open slot portion 261 is greater than 1.4 times the first gap X1 of the first open slot portion 271, the second gap X2 may be excessively large and thus there may be a problem of assembly strength. FIG. 7 is a graph showing a torque ripple in a case in which a size of the second open slot portion is maintained to be constant and a size of the first open slot portion is changed.

As illustrated in the drawing, the second gap X2 (see FIG. 6) of the second open slot portion 261 (see FIG. 6) is constantly maintained at 2.6 mm, and the first gap X1 (see FIG. 6) of the first open slot portion 271 (see FIG. 6) is changed step by step from 2.6 mm to 1.0 mm. As a result, an effect can be seen that a torque is not changed and a torque ripple is reduced at the same current even when the size of the first open slot portion 271 (see FIG. 6) is decreased.

Figure 8:
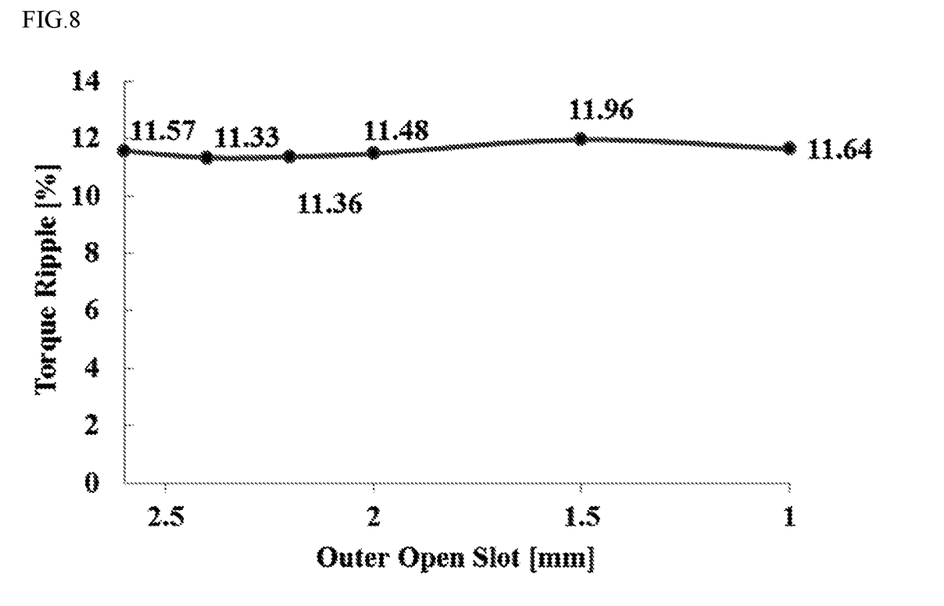
FIG. 8 is a graph showing a torque ripple in a case in which the size of the first open slot portion is maintained to be constant and the size of the second open slot portion is changed.

FIG. 8 is a graph showing a torque ripple in a case in which the size of the first open slot portion is maintained to be constant and the size of the second open slot portion is changed.

As illustrated in the drawing, the size of the first gap X1 (see FIG. 6) of the first open slot portion 271 (see FIG. 6) is constantly maintained at 2.6 mm and the size of the second gap X2 (see FIG. 6) of the second open slot portion 261 (see FIG. 6) is changed step by step from 2.6 mm to 1.0 mm. As a result, it can be seen that a torque ripple is changed according to a change in the size of the second open slot portion 261 (see FIG. 6).

As described above, according to the second embodiment of the present invention, a torque ripple can be reduced without decreasing efficiency of the motor by suitably adjusting the size of the open slot portion stator between the inner side teeth and the size of the open slot portion between the outer side teeth at a suitable ratio. For example, a size X1 of the open slot portion between the inner side teeth and a size X2 of the open slot portion between the outer side teeth may be adjusted at a predetermined ratio, for example, X2/X1=1.2 to 1.4. As a result, an effect of decreasing a torque ripple is obtained like a skew effect and a decrease in efficiency of the motor can be prevented.

Meanwhile, according to the embodiments of the present invention, a compressor including the above-described dual rotor-type motor, a shaft, a connecting rod, a cylinder, and a cylinder block is provided. The shaft passes through and is coupled to rotation centers of the outer rotor and the inner rotor and rotates with the above-described outer rotor and the inner rotor in the compressor. The cylinder block supports the shaft such that the shaft rotates at an inner side center thereof. In addition, the cylinder compressing a refrigerant may be provided through the cylinder block. The connecting rod is connected to an upper portion of the shaft to linearly operate a piston using a rotation force of the shaft. The cylinder stores the refrigerant and compresses the refrigerant using the piston.

Although the present invention has been described with reference to the accompanying drawings as described above, the present invention is not limited by the embodiments and drawings illustrated in the present specification, and it is clear that the present invention is variously modified by those skilled in the art within a range of the technical spirit of the present invention. In addition, while the embodiments of the present invention have been described, although the operational effects according to the structure of the present invention have not been clearly described, predictable effects according to the corresponding structure should also be recognized.

What is claimed is:

1. A dual rotor-type motor comprising:
a stator;
a coil wound around the stator;
an outer rotor that faces an outer wheel of the stator, the outer rotor comprising a plurality of outer permanent magnets that are disposed on an inner circumferential surface of the outer rotor and arranged along a circumferential direction; and
an inner rotor that faces an inner wheel of the stator, the inner rotor comprising a plurality of inner permanent magnets that are disposed on an outer circumferential surface of the inner rotor and arranged along the circumferential direction,
wherein the stator comprises:
outer side teeth that face the outer rotor, and
inner side teeth that face the inner rotor and are misaligned with respect to the outer side teeth by a preset angle in the circumferential direction, and
wherein the preset angle is in a range greater than or equal to −2° and less than 0° with respect to the outer side teeth, or in a range greater than 0° and less than or equal to 4° with respect to the outer side teeth.

2. The dual rotor-type motor of claim 1, wherein the plurality of outer permanent magnets are configured to generate a first magnetic flux passing through at least a portion of the stator,
wherein the plurality of inner permanent magnets are configured to generate a second magnetic flux passing through at least the portion of the stator and interfering with the first magnetic flux, and
wherein the stator is configured to, based on misalignment between the inner side teeth and the outer side teeth, reduce a torque ripple of the dual rotor-type motor.

3. The dual rotor-type motor of claim 1, wherein a number of the plurality of outer permanent magnets is equal to a number of the plurality of inner permanent magnets, and
wherein each of the plurality of outer permanent magnets and each of the plurality of inner permanent magnets extend radially opposite directions.

4. The dual rotor-type motor of claim 1, wherein the plurality of outer permanent magnets are arranged to have N-poles and S-poles alternately along the circumferential direction.

5. The dual rotor-type motor of claim 1, wherein the plurality of inner permanent magnets are arranged to have N-poles and S-poles alternately along the circumferential direction.

* * * * *